United States Patent
Li et al.

(10) Patent No.: US 10,462,243 B2
(45) Date of Patent: Oct. 29, 2019

(54) METHOD AND DEVICE FOR INTERACTION BETWEEN TERMINALS

(71) Applicant: Tencent Technology (Shenzhen) Company Limited, Shenzhen (CN)

(72) Inventors: Tong Li, Shenzhen (CN); Long Cheng, Shenzhen (CN); Haiying Ou, Shenzhen (CN); Yang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 133 days.

(21) Appl. No.: 15/666,008

(22) Filed: Aug. 1, 2017

(65) Prior Publication Data
US 2017/0329486 A1 Nov. 16, 2017

Related U.S. Application Data

(63) Continuation of application No. PCT/CN2016/081865, filed on May 12, 2016.

(30) Foreign Application Priority Data

May 29, 2015 (CN) .......................... 2015 1 0287733

(51) Int. Cl.
*H04L 29/08* (2006.01)
*G06F 3/0489* (2013.01)
(Continued)

(52) U.S. Cl.
CPC ............ *H04L 67/22* (2013.01); *G06F 3/0233* (2013.01); *G06F 3/0484* (2013.01);
(Continued)

(58) Field of Classification Search
CPC ......... G06F 3/023; G06F 3/0233–0237; G06F 3/0484; G06F 3/04847; G06F 3/0487;
(Continued)

(56) References Cited

U.S. PATENT DOCUMENTS

| | | | |
|---|---|---|---|
| 7,512,899 B1* | 3/2009 | Hoiem | G06F 9/451 715/825 |
| 2001/0011995 A1* | 8/2001 | Hinckley | G06F 3/0489 345/156 |

(Continued)

FOREIGN PATENT DOCUMENTS

| CN | 1585433 A | 2/2005 |
|---|---|---|
| CN | 1946213 A | 4/2007 |

(Continued)

OTHER PUBLICATIONS

International Search Report for corresponding application PCT/CN2016/081865 filed May 12, 2016; dated Aug. 24, 2016.

(Continued)

Primary Examiner — Nathan Danielsen
(74) Attorney, Agent, or Firm — Cantor Colburn LLP (57) ABSTRACT

A method and device for interaction between terminals are described. The method includes that: a keyboard operation message is received (S101); indication information of a corresponding operated key is acquired according to the keyboard operation message (S102); key meaning information corresponding to the indication information is acquired according to a preset keyboard escape table (S103); the indication information and the corresponding key meaning information are displayed in a shared screen (S104); and the contents displayed in the shared screen are sent to a target terminal when a sharing request of the target terminal is received (S105). According to the embodiment of the method and the device, a sender sends both information of indicating an operated key and corresponding key meaning information to the receiver, and compared with an existing manner of only providing limited one-way propagation, such a manner has the advantages that the receiver may clearly and directly know a practical operation of the sender, (Continued)

and propagation effects between the terminals may be improved.

20 Claims, 4 Drawing Sheets (51) Int. Cl.
G06F 3/0484 (2013.01)
G06F 3/023 (2006.01)
H04N 7/15 (2006.01)
G06F 9/451 (2018.01)
H04N 7/14 (2006.01)
H04L 29/06 (2006.01)
G06Q 10/10 (2012.01)

(52) U.S. Cl.
CPC ............ G06F 3/0489 (2013.01); G06F 9/451 (2018.02); H04L 67/38 (2013.01); H04N 7/147 (2013.01); H04N 7/15 (2013.01); G06Q 10/10 (2013.01); G06Q 10/101 (2013.01); H04L 65/403 (2013.01)

(58) Field of Classification Search
CPC .......... G06F 3/0489–04897; G06F 9/451–454; G06F 2203/04808; G06F 2209/547; G06F 2209/549; H04L 67/22; H04L 67/38; H04L 65/403–4053; H04N 7/14; H04N 7/147; H04N 7/15; H04N 7/152; H04N 2007/145
See application file for complete search history.

(56) References Cited

U.S. PATENT DOCUMENTS

2006/0092268 A1    5/2006  Ahn
2016/0295170 A1*  10/2016  White .................... H04N 7/142

FOREIGN PATENT DOCUMENTS

| CN | 101266517 A | 9/2008 |
| CN | 101419499 A | 4/2009 |
| CN | 102393894 A | 3/2012 |
| JP | 2009110258 A | 5/2009 |

OTHER PUBLICATIONS

Internet Article: Carnac, URL: https://www.appin.com/carnac/; Dated Mar. 7, 2013.

* cited by examiner

METHOD AND DEVICE FOR INTERACTION BETWEEN TERMINALS

CROSS REFERENCE TO RELATED APPLICATIONS

This application is continuation of International Application No. PCT/CN2016/081865, filed May 12, 2016, which claims priority to Chinese Patent Application with No. 201510287733.2, filed to SIPO on May 29, 2015 and named as "method and device for interaction between terminals", the entire contents of which said applications are incorporated herein by reference

TECHNICAL FIELD

The disclosure belongs to the technical field of communication, and particularly relates to a method and device for interaction between terminals.

BACKGROUND

Along with rapid development of a multimedia technology, a communication technology and the Internet, applications such as remote control, synchronization or communication between terminals are more and more spread, and for example, network-based remote education is one of the applications.

Remote education refers to an education form of implementing systematic teaching and communication contact between a student and a teacher and between a student and an educational organization by utilizing multiple media manners. In a conventional art, a sender mainly sends a curriculum to the other receivers through an audio, a video (live or recorded) and real-time and non-real-time computer technologies. Therefore, a lot of convenient learning opportunities are provided for people to make learning activities more autonomous and personalized. Moreover, education adaptability is greatly enhanced, and particularly, rise of multiple pieces of open source code-based software makes network applications more personalized and popular.

In a research and practice process of the conventional art, the inventor of the invention finds that propagation effects in an existing solution are poor because live or recorded audios or videos are mainly adopted for propagation, that is, only limited one-way propagation may be provided, and a receiver may not clearly and directly know a practical operation of a sender.

SUMMARY

The embodiment of the disclosure provides a method and device for interaction between terminals, which are intended to enable a receiver to clearly and directly know a practical operation of a sender and improve propagation effects between terminals in a terminal propagation process.

In order to solve the abovementioned technical problem, the following technical solution in one embodiment of the disclosure is provided.

A method for interaction between terminals is provided, wherein the method is performed at a device having one or more processors and a memory for storing programs to be executed by the processors, the method includes: a keyboard operation message is received; indication information of a corresponding operated key is acquired according to the keyboard operation message; key meaning information corresponding to the indication information is acquired according to a preset keyboard escape table; the indication information and the corresponding key meaning information are displayed in a shared screen; and contents displayed in the shared screen are sent to a target terminal when a sharing request of the target terminal is received.

In order to solve the abovementioned technical problem, the following technical solution in another embodiment of the disclosure is further provided.

A device for interaction between terminals is provided, which includes: one or more processors, configured to execute one or more program modules stored in a memory; the memory; and wherein the one or more program modules further include a receiving module, configured to receive a keyboard operation message; a first acquiring module, configured to acquire indication information of a corresponding operated key according to the keyboard operation message; a second acquiring module, configured to acquire key meaning information corresponding to the indication information according to a preset keyboard escape table; a displaying module, configured to display the indication information and the corresponding key meaning information in a shared screen; and a sharing and sending module, configured to send contents displayed in the shared screen to a target terminal when a sharing request of the target terminal is received.

In order to solve the abovementioned technical problem, the following technical solution in another embodiment of the disclosure is further provided.

A non-transitory computer-readable storage medium is provided, wherein the non-transitory computer-readable storage medium is configured to store program codes configured to execute following steps: receiving a keyboard operation message; acquiring indication information of a corresponding operated key according to the keyboard operation message; acquiring key meaning information corresponding to the indication information according to a preset keyboard escape table; displaying the indication information and the corresponding key meaning information in a shared screen; and sending contents displayed in the shared screen to a target terminal when a sharing request of the target terminal is received.

Compared with the conventional art, the embodiment has the advantages that indication information of a corresponding operated key is acquired according to a keyboard operation message input by a user, corresponding key meaning information is acquired according to a preset keyboard escape table, the indication information and the corresponding key meaning information are displayed together, and contents displayed in the shared screen are sent to the target terminal when a sharing request of a receiver (i.e. the target terminal) is received. In the embodiment of the invention, a sender sends both the information of indicating the operated key and the corresponding key meaning information to the receiver, and compared with an existing manner of only providing limited one-way propagation, such a manner has the advantages that the receiver may clearly and directly know a practical operation of the sender, and propagation effects between the terminals may be improved.

BRIEF DESCRIPTION OF THE DRAWINGS

Specific implementation modes of the invention will be described below with reference to the drawings in detail to make the technical solutions and other beneficial effects of the invention obvious.

DETAILED DESCRIPTION OF THE EMBODIMENTS

Referring to the drawings where the same component symbols represent the same components, the principle of the invention is described with implementation in a proper computing environment as an example. Descriptions made below are made on the basis of specific exemplified embodiments of the invention and should not be considered as limits to other specific embodiments, which are not detailed herein, of the invention.

In the descriptions made below, the specific embodiments of the invention will be described with reference to steps and symbols executed by one or more computers, unless otherwise stated. Therefore, it will be mentioned for many times that these steps and operations are executed by the computer, and execution by the computers in the invention includes an operation of a processing unit of the computer over an electronic signal representative of data in a structured form. The operation converts the data or keeps it at a position in a memory system of the computer, and it may be reconfigured or change running of the computer in another manner with which those skilled in the art are familiar. A data structure maintained by the data is a physical position of a memory, and it has a specific characteristic defined by the data format. However, the above literal descriptions of the principle of the invention are not intended to form a limit, and those skilled in the art may know that multiple steps and operations described below may also be implemented in hardware.

The principle of the invention is implemented by virtue of many other general or specific purpose computing and communication environments or configurations. Familiar examples of computing systems, environments and configurations suitable for the invention may include (but not limited to) a mobile phone, a Personal Computer (PC), a server, a multiprocessor system, a microcomputer-based system, a main frame type computer and a distributed computing environment including any of the abovementioned systems or devices.

Term "module" used in the invention may be considered as a software object executed on a computing system. Different components, modules, engines and servers mentioned in the invention may be considered as implementation objects on the computing system. The device and method of the invention are preferably implemented in a software manner, and of course, may also be implemented on hardware, and both implementation manners fall within the scope of protection of the invention.

The embodiment of the invention provides a method and device for interaction between terminals, the method and device for interaction between the terminals may be integrated in a terminal for running, and the terminal may be a terminal which has a storage unit and a computing capability and is installed with a microprocessor such as a notebook computer, a PC (Personal Computer) and a mobile phone, which is not specifically limited in the embodiment of the invention.

At first, the terminal acquires indication information of a corresponding operated key according to a keyboard operation message input by a user, acquires corresponding key meaning information according to a preset keyboard escape table, and displays the indication information and the corresponding key meaning information together, and the terminal sends contents displayed in a shared screen to a target terminal when a sharing request of the target terminal is received. The terminal, as a sender, sends the information of indicating the operated key and the corresponding key meaning information together to a receiver (i.e. the target terminal). Compared with an existing manner of only providing limited one-way propagation, such a manner has the advantages that the receiver may clearly and directly know a practical operation of the sender, and propagation effects between the terminals may be improved. For example, during remote network-based education, a receiver may clearly know a practical operation of a sender according to the information of indicating the operated key and the corresponding key meaning information, which are sent by a sender, so as to facilitate understanding of a user of the receiver.

Detailed descriptions will be made below respectively.

First Embodiment

In the embodiment, descriptions are made from the point of a sending terminal. A method for interaction between terminals includes that: a keyboard operation message is received; indication information of a corresponding operated key is acquired according to the keyboard operation message; key meaning information corresponding to the indication information is acquired according to a preset keyboard escape table; the indication information and the corresponding key meaning information are displayed in a shared screen; and contents displayed in the shared screen are sent to a target terminal when a sharing request of the target terminal is received.

Figure 1:
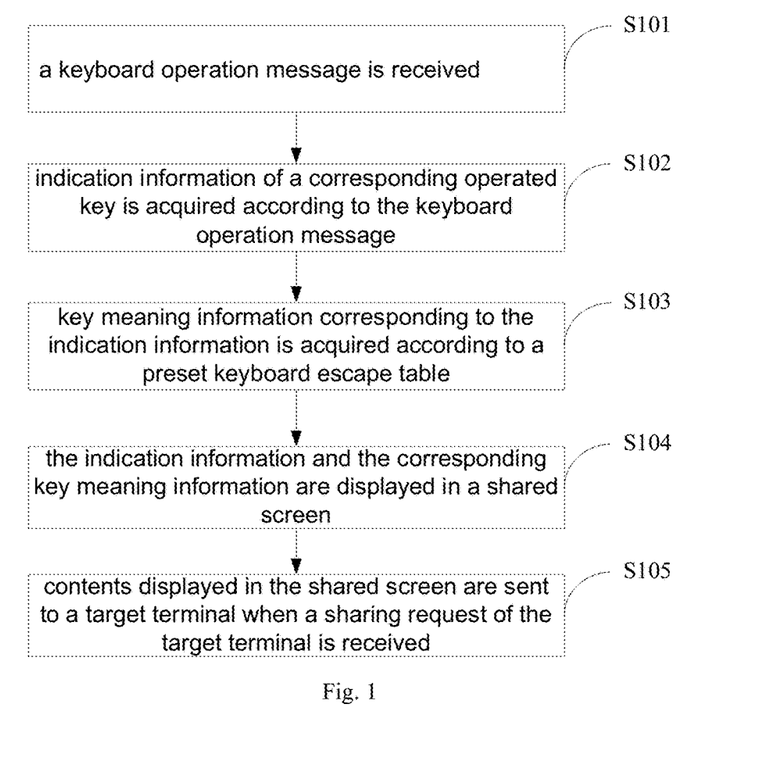
FIG. 1 is a flowchart of a method for interaction between terminals according to a first embodiment of the invention.

Referring to FIG. 1, FIG. 1 is a flowchart of a method for interaction between terminals according to a first embodiment of the invention. The method includes the following steps.

Step 101: a keyboard operation message is received.

It may be understood that the keyboard operation message may be triggered to be sent by clicking a key of a keyboard by a user; and before the keyboard operation message is received, it is required to perform presetting operation to enable a terminal to obtain the keyboard operation message at any time.

For example: a global keyboard hook is registered, that is, a keyboard hook is registered, which refers to intercepting and processing a keyboard message in advance by using an Application Programming Interface (API). The global hook is one of system hooks, and when some specified messages are processed by any application program in a system, the hook is called.

Step 102: indication information of a corresponding operated key is acquired according to the keyboard operation message.

That is, the terminal acquires indication information of a corresponding operated key according to the keyboard operation message, wherein the indication information is mainly configured to indicate information about a key currently operated by the user. For example, when the user presses key "F3", the indication information indicates "F3", and for another example, when the user simultaneously presses keys "Ctrl" and "N", the indication information indicates "Ctrl+N".

Furthermore, after "the keyboard operation message is received" and before "the indication information of the corresponding operated key is acquired according to the keyboard operation message", the method may further include that:

(1) a window of a currently obtained window focus is determined; and (2) a terminal application which processes the keyboard operation message is determined according to the window of the currently obtained window focus.

It may be understood that a window is a message receiving entity in a Windows system, and windows may send the keyboard operation message to the window of the currently obtained window focus. Each execution thread may only can configure or acquire a focus of a window created by the current thread, so that mutual influence of application programs may be prevented; and a response delay of a certain application program may not make another application program pause its response to an operation of the user.

For example, when the terminal determines the window of the currently obtained window focus and determines that terminal application "PhotoShop" processes the keyboard operation message according to the window of the currently obtained window focus, the terminal acquires the indication information of the corresponding operated key according to the keyboard operation message on the basis of "PhotoShop".

Step 103: key meaning information corresponding to the indication information is acquired according to a preset keyboard escape table.

In the above, the keyboard escape table is preset, and it mainly records a corresponding relationship between operated key information and key meaning information; and it may be understood that keyboard escape tables are correspondingly set for each of different terminal applications.

For example, before "the keyboard meaning information corresponding to the indication information is acquired according to the preset keyboard escape table", the corresponding preset keyboard escape table may also be acquired according to the determined terminal application, and then, the key meaning information corresponding to the indication information is acquired on the basis of the terminal application and the corresponding keyboard escape table.

Step 104: the indication information and the corresponding key meaning information are displayed in a shared screen.

Step 105: contents displayed in the shared screen are sent to a target terminal when a sharing request of the target terminal is received.

In the above, Step 104 and Step 105 may specifically be implemented as follows.

It may be understood that the shared screen is a terminal screen of a sender, and after the indication information and the corresponding key meaning information are acquired, the indication information and the corresponding key meaning information may be displayed in a preset area of the shared screen together, wherein the preset area may be an area on a left lower part or right lower part of the terminal screen of the sender, or may be displayed in a floating window form, or in a semitransparent control form or the like without influence on the query about other contents displayed on the terminal screen.

Furthermore, the contents displayed in the shared screen are sent to the target terminal when the sharing request of the target terminal is received, and are displayed in a terminal screen of the target terminal, wherein a connection may be pre-established between the sender and a receiver (i.e. the target terminal) to enable a user of the receiver to clearly know a practical operation of the user of the sender according to the indication information and the corresponding key meaning information.

From the above, it can be seen that: according to the method for interaction between the terminals provided by the embodiment, indication information of a corresponding operated key is acquired according to a keyboard operation message input by the user, the corresponding key meaning information is acquired according to the preset keyboard escape table, the indication information and the corresponding key meaning information are displayed together, and contents displayed in the shared screen are sent to the target terminal when the sharing request of a receiver (i.e. the target terminal) is received; and in the embodiment of the invention, the sender sends both the information of indicating the operated key and the corresponding key meaning information to the receiver, and compared with an existing manner of only providing limited one-way propagation, such a manner has the advantages that the receiver may clearly and directly know the practical operation of the sender, and propagation effects between the terminals may be improved.

Second Embodiment

According to the method described in the first embodiment, detailed descriptions will be further made with an example.

At first, a sending terminal (such as terminal A) and receiving terminals (such as terminal B1, terminal B2, . . . terminal BN, wherein N represents the number of the receiving terminals) establish network connections (such as remote-education-based network connections), so that the sending terminal may send contents in a shared screen to the receiving terminals, the shared contents including image contents required to be displayed and further including indication information about a key operated by a user of the sending terminal and corresponding key meaning information.

Figure 2A:
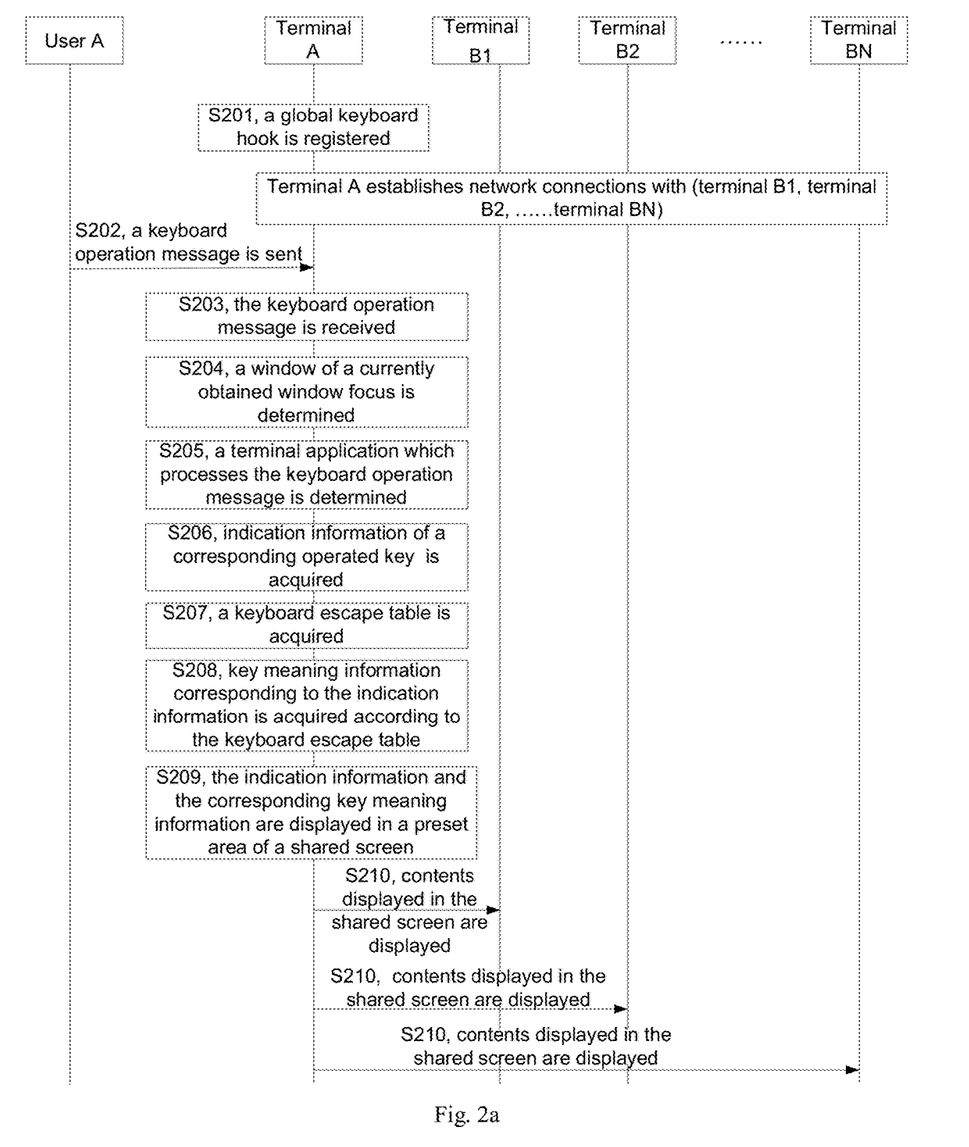
FIG. 2a is a flowchart of a method for interaction between terminals according to a second embodiment of the invention.

Referring to FIG. 2*a*, FIG. 2*a* is a flowchart of a method for interaction between terminals according to a second embodiment of the invention. It may be understood that user A is an operating user of terminal A as shown in FIG. 2*a*, which is disclosed not as a part of a system where the interaction method is executed but only for facilitating understanding, and the method includes the following steps.

Step 201: terminal A registers a global keyboard hook.

Terminal A pre-registers a keyboard hook, and the keyboard hook refers to intercepting and processing a keyboard message in advantage by using an API. The global keyboard key is one of systems hooks, and when some specified messages are processed by any application program in a system, the hook is called.

It may be understood that a hook is a very important system interface in a Windows system, and it may be adopted to intercept and process a message sent to another application program to realize a function which is difficult to be realized by an ordinary application program. There are many types of hooks, each type of the hooks may intercept and process a corresponding message, and for example, the keyboard hook in the embodiment may intercept a keyboard message.

Step 202: user A triggers to send a keyboard operation message by clicking a key of a keyboard of terminal A.

Step 203: terminal A receives the keyboard operation message sent by user A through the global keyboard hook.

In the above, Step 202 and Step 203 may specifically be implemented as follows.

For example, user A simultaneously presses keys "Ctrl" and "N" through the keyboard to send the keyboard operation message to terminal A, and terminal A may acquire the keyboard operation message by using the global keyboard hook.

Step 204: terminal A determines a window of a currently obtained window focus.

Step 205: terminal A determines a terminal application which processes the keyboard operation message according to the window of the currently obtained window focus.

Step 206: terminal A acquires indication information of the corresponding operated key according to the keyboard operation message on the basis of the terminal application.

In the above, Step 204 and Step 206 may specifically be implemented as follows.

A window is a message receiving entity in a Windows system, and windows may send the keyboard operation message to the window of the currently obtained window focus. Each execution thread may only configure or acquire a focus of a window created by the current thread, so that mutual influence of application programs may be prevented; and a response delay of a certain application program may not make another application program pause its response to an operation of the user.

For example, when the terminal A determines the window of the currently obtained window focus and determines that terminal application "PhotoShop" processes the keyboard operation message according to the window of the currently obtained window focus, the terminal A acquires the indication information of the corresponding operated key according to the keyboard operation message on the basis of "PhotoShop".

In the above, the indication information is mainly configured to indicate information about the key currently operated by the user. For example, when the user presses key "F3", the indication information indicates "F3", and for another example, when the user simultaneously presses keys "Ctrl" and "N", the indication information indicates "Ctrl+N".

Step 207: terminal A acquires a preset corresponding keyboard escape table according to the terminal application.

Step 208: terminal A acquires key meaning information corresponding to the indication information according to the preset keyboard escape table.

In the above, Step 207 to Step 208 may specifically be implemented as follows.

The keyboard escape table is preset, and it mainly records a corresponding relationship between operated key information and key meaning information; and it may be understood that keyboard escape tables are correspondingly set for each of different terminal applications.

For example, a preset corresponding keyboard escape table is acquired according to the determined terminal application "PhotoShop", as shown in Table 1, and then, the key meaning information corresponding to the indication information is acquired on the basis of the terminal application and the corresponding keyboard escape table.

TABLE 1

| Key meaning information | Indication information of operated key |
|---|---|
| Create | Ctrl + N |
| Open | Ctrl + O |
| Open as | Alt + Shift + Ctrl + O |
| Save | Ctrl + S |
| Save as | Shift + Ctrl + S or Alt + Ctrl + S |
| Print | Ctrl + P |
| Exit | Ctrl + Q |
| Revoke (or called as Undo) | Ctrl + Z |
| Step forward | Shift + Ctrl + Z |
| Step backward | Alt + Ctrl + Z |
| Copy | Ctrl + C or F3 |
| Paste | Ctrl + V F4 |
| Free transform | Ctrl + T |
| Transform again | Shift + Ctrl + T |
| Color setting | Shift + Ctrl + K |

It may be understood that the keyboard escape tables are correspondingly set for each terminal application, which is pre-configured by a developer, and Table 1 is only an example for description and not intended to limit the corresponding relationship between the key meaning information and the indication information of the operated key.

Step 209: terminal A displays the indication information and the corresponding key meaning information in a preset area of the shared screen.

Step 210: terminal A sends contents displayed in the shared screen to a receiving terminal.

In the above, Step 209 and Step 210 may specifically be implemented as follows.

Figure 2B:
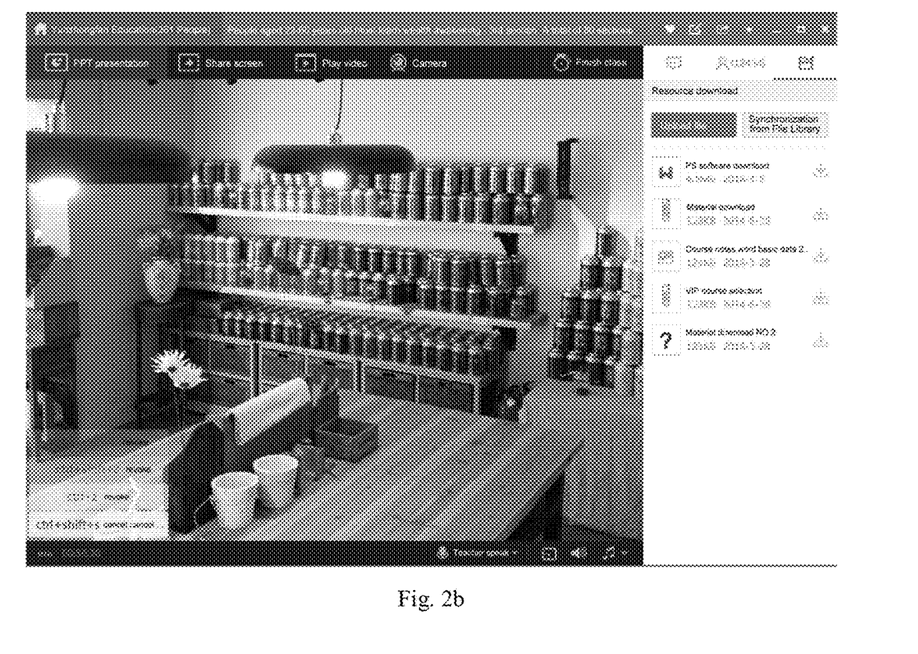
FIG. 2b is a display diagram of a shared screen of a terminal according to a second embodiment of the invention.

After the indication information and the corresponding key meaning information are acquired, the indication information and the corresponding key meaning information may be displayed in the preset area of the shared screen of terminal A together, wherein the preset area may be an area on a left lower part or right lower part of the terminal screen of the terminal A, or may be displayed in a floating window form, a semitransparent control form or the like without influence on query about other contents displayed on the terminal screen. FIG. 2b is a display diagram of the shared screen.

For example, terminal A displays a curriculum operated by PhotoShop to the receiving terminals (terminal B1, terminal B2, . . . terminal BN) in a remote education manner. Key operation information of terminal A is displayed on the screen by using an existing video function of the shared screen of terminal A (such as a computer of a teacher) at first, and then is sent to a receiving terminal (such as a computer of a student) by using a screen sharing function, so that the student may see a keyboard operation of the teacher. In addition, when the keyboard operation of the teacher is displayed, a shortcut key meaning of the keyboard operation is also displayed. Herein, a key on which the keyboard operation is executed and the meaning are mapped into a "keyboard escape table".

For another example, during specific implementation, terminal A determines a program (for example, PhotoShop is determined) which processes the keyboard message through the window of the currently obtained window focus, after terminal A acquires the keyboard operation of the teacher. Then, the "keyboard escape table" is queried to obtain its Chinese meaning in combination with the corresponding key, and the Chinese meaning and the key are both displayed in a screen area shared by the teacher.

At this moment, the keyboard shortcut key operation of the teacher is displayed to the student, and as shown in FIG. 2b, the student watches a screenshot demonstrated by the teacher. In a conventional online class, only a change on the screen of the teacher may be seen, but the student is not sure about an operation, which causes the change, of the teacher (such as pressing a key on the keyboard). In such a display method, the operation which is executed by the teacher may be displayed on a left side of a shared interface in real time. For example, referring to Table 1, if the teacher simultaneously presses keys "Ctrl" and "Z" in "PhotoShop", the student may synchronously see "Ctrl+Z" on the left side of the screen and also see its Chinese meaning "Revoke".

From the above, according to the method for interaction between terminals provided by the embodiment, indication information of a corresponding operated key is acquired according to a keyboard operation message input by the user, the corresponding key meaning information is acquired according to the preset keyboard escape table, the indication information and the corresponding key meaning information are displayed together, and contents displayed in the shared screen are sent to a target terminal when the sharing request of a receiver (i.e. the target terminal) is received; and in the embodiment of the invention, the sender sends both the information of indicating the operated key and the corresponding key meaning information to the receiver, and compared with an existing manner of only providing limited one-way propagation, such a manner has the advantages that the receiver may clearly and directly know the practical operation of the sender, and propagation effects between the terminals may be improved. For example, during remote network-based education, a receiver may clearly know a practical operation of a sender according to the information of indicating the operated key and the corresponding key meaning information, which are sent by a sender, so that accuracy of a directional teaching operation and teaching real-time performance are improved, and understanding of the user of the receiver is facilitated.

Third Embodiment

In order to better implement the method for interaction between the terminals provided by the embodiment of the invention, the embodiment of the invention further provides a device based on the abovementioned method for interaction between the terminals, wherein meanings of nouns are the same as those in the abovementioned method for interaction between the terminals, and specific implementation details may refer to descriptions in the method embodiment.

Figure 3:
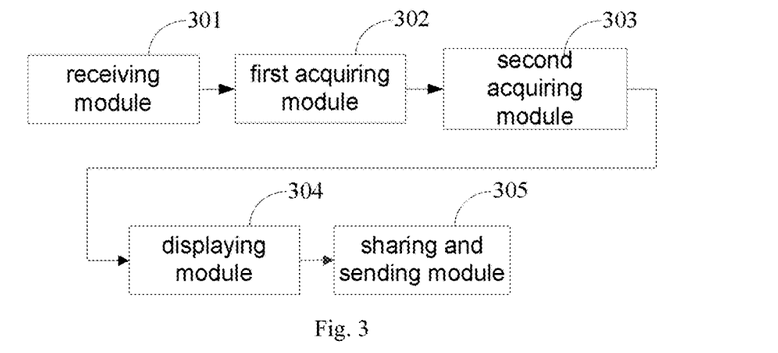
FIG. 3 is a structure diagram of a device for interaction between terminals according to a third embodiment of the invention.

Referring to FIG. 3, FIG. 3 is a structure diagram of a device for interaction between terminals according to an embodiment of the invention, and the device may include a receiving module 301, a first acquiring module 302, a second acquiring module 303, a displaying module 304 and a sharing and sending module 305.

In the above, the receiving module 301 is configured to receive a keyboard operation message; and the first acquiring module 302 is configured to acquire indication information of a corresponding operated key according to the keyboard operation message.

It may be understood that the keyboard operation message may be triggered to be sent by clicking a key of a keyboard by a user; and before the keyboard operation message is received, it is required to perform a presetting operation to enable a terminal to obtain the keyboard operation message at any time.

For example: a global keyboard hook is registered, that is, a keyboard hook is registered, which refers to intercepting and processing a keyboard message in advance by using an Application Programming Interface (API). The global keyboard hook is one of system hooks, and when some specified messages are processed by any application program in a system, the hook is called.

The first acquiring module 302 acquires indication information of a corresponding operated key according to the keyboard operation message, wherein the indication information is mainly configured to indicate information about a key currently operated by a user. For example, when the user presses key "F3", the indication information indicates "F3", and for another example, when the user simultaneously presses keys "Ctrl" and "N", the indication information indicates "Ctrl+N".

The second acquiring module 303 is configured to acquire key meaning information corresponding to the indication information according to a preset keyboard escape table.

In the above, the keyboard escape table is preset, and it mainly records a corresponding relationship between operated key information and key meaning information; and it may be understood that keyboard escape tables are correspondingly set for each of different terminal applications.

For example, before "the keyboard meaning information corresponding to the indication information is acquired according to the preset keyboard escape table", the corresponding preset keyboard escape table may also be acquired according to the determined terminal application, and then, the key meaning information corresponding to the indication information is acquired on the basis of the terminal application and the corresponding keyboard escape table.

The displaying module 304 is configured to display the indication information and the corresponding key meaning information in a shared screen; and the sharing and sending module 305 is configured to send the contents displayed in the shared screen to a target terminal when a sharing request of the target terminal is received.

It may be understood that the shared screen is a terminal screen of a sender, and after the indication information and the corresponding key meaning information are acquired, the indication information and the corresponding key meaning information may be displayed in a preset area of the shared screen together, wherein the preset area may be an area on a left lower part or right lower part of the terminal screen of the sender, or may be display in a floating window form, a semitransparent control form or the like without influence on query about other contents displayed on the terminal screen.

Furthermore, the contents displayed in the shared screen are sent to the target terminal when the sharing request of the target terminal is received, and are displayed in a terminal screen of the target terminal, wherein a connection may be pre-established between the sender and a receiver (i.e. the target terminal) to enable a user of the receiver to clearly know a practical operation of the user of the sender according to the indication information and the corresponding key meaning information.

From the above, it can be seen that: according to the device for interaction between the terminals provided by the embodiment, the device is integrated in a sending terminal, acquires indication information of a corresponding operated key according to a keyboard operation message input by the user, acquires corresponding key meaning information according to a preset keyboard escape table, displays the indication information and the corresponding key meaning information together, and sends contents displayed in the shared screen to the target terminal when the sharing request of a receiver (i.e. the target terminal) is received; and in the embodiment of the invention, the sender sends both the information of indicating the operated key and the corresponding key meaning information to the receiver, and compared with an existing manner of only providing limited one-way propagation, such a manner has the advantages that the receiver may clearly and directly know the practical operation of the sender, and propagation effects between the terminals may be improved.

Fourth Embodiment

Figure 4:
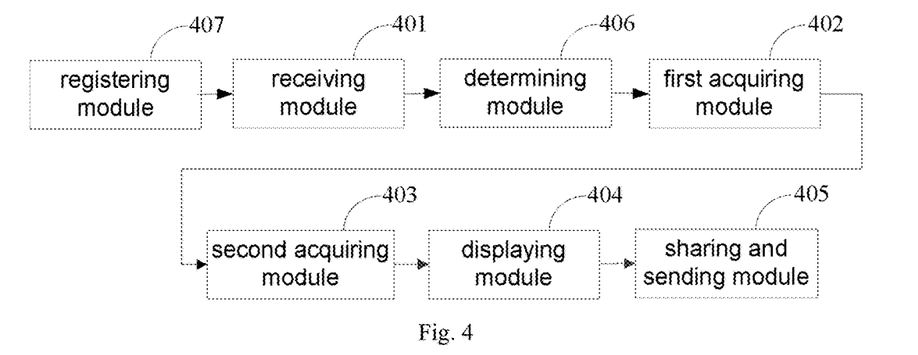
FIG. 4 is a structure diagram of a device for interaction between terminals according to a fourth embodiment of the invention.

Referring to FIG. 4, FIG. 4 is a structure diagram of a device for interaction between terminals according to an embodiment of the invention, wherein the device for interaction between the terminals includes: a receiving module 401, a first acquiring module 402, a second acquiring module 403, a displaying module 404 and a sharing and sending module 405, wherein functions of each function module in the embodiment may sequentially and correspondingly refer to related descriptions about the receiving module 301, first acquiring module 302, second acquiring module 303, displaying module 304 and sharing and sending module 305 in the third embodiment, and will not be elaborated herein.

Preferably, the device may further include:

a determining module 406, configured to determine a window of a currently obtained window focus, and determine a terminal application which processes the keyboard operation message according to the window of the currently obtained window focus.

In the above, the first acquiring module 402 may be configured to acquire indication information of a corresponding operated key according to a keyboard operation message on the basis of the terminal application.

It may be understood that a window is a message receiving entity in a Windows system, and windows may send the keyboard operation message to the window of the currently obtained window focus. Each execution thread may only configure or acquire a focus of a window created by the current thread, so that mutual influence of application programs may be prevented; and a response delay of a certain application program may not make another application program pause its response to an operation of the user.

For example, when the determining module 406 determines the window of the currently obtained window focus and determines that terminal application "PhotoShop" processes the keyboard operation message according to the window of the currently obtained window focus, the first acquiring module 402 acquires the indication information of the corresponding operated key according to the keyboard operation message on the basis of "PhotoShop".

Furthermore, the second acquiring module 403 may further be configured to acquire a preset corresponding keyboard escape table according to the terminal application.

The keyboard escape table is preset, and it mainly records a corresponding relationship between operated key information and key meaning information; and it may be understood that keyboard escape tables are correspondingly set for each of different terminal applications.

For example, the corresponding preset keyboard escape table is acquired according to the determined terminal application "PhotoShop", and then, the key meaning information corresponding to the indication information is acquired on the basis of the terminal application and the corresponding keyboard escape table.

Alternatively, the device may further include: a registering module 407, configured to register a global keyboard hook; and then the receiving module 401 is configured to receive the keyboard operation message through the global keyboard hook.

That is, the registering module 407 pre-registers the keyboard hook, and the keyboard hook refers to intercepting and processing a keyboard message in advance by using an API. The global keyboard key is one of systems hooks, and when some specified messages are processed by any application program in a system, the hook is called. For example, the keyboard hook in the embodiment may intercept the keyboard message.

The receiving module 401 may further be configured to receive the keyboard operation message triggered to be sent by clicking a key of a keyboard by a user. For example, when user A simultaneously presses keys "Ctrl" and "N" through the keyboard to send the keyboard operation message to terminal A, and terminal A acquires the keyboard operation message by virtue of the global keyboard hook.

After the indication information and the corresponding key meaning information are acquired, the displaying module 404 may further be configured to display the indication information and the corresponding key meaning information in a preset area of the shared screen.

That is, the indication information and the corresponding key meaning information may be displayed in the preset area of the shared screen of terminal A together, wherein the preset area may be an area on a left lower part or right lower part of the terminal screen of the sender, or may be displayed in a floating window form, or a semitransparent control form or the like without influence on query about other contents displayed on the terminal screen.

During specific implementation, each of the abovementioned modules may be implemented as independent entities, and may also be freely combined for implementation as the same entity or a plurality of entities, and specific implementation of each of the abovementioned modules may refer to the abovementioned second method embodiment, and will not be elaborated herein.

From the above, it can be seen that: according to the device for interaction between the terminals provided by the embodiment, the device is integrated in a sending terminal, acquires indication information of a corresponding operated key according to a keyboard operation message input by a user, acquires corresponding key meaning information according to a preset keyboard escape table, displays the indication information and the corresponding key meaning information together, and sends contents displayed in the shared screen to a target terminal when a sharing request of a receiver (i.e. the target terminal) is received; and in the embodiment of the invention, the sender sends both the information of indicating the operated key and the corresponding key meaning information to the receiver, and compared with an existing manner of only providing limited one-way propagation, such a manner has the advantages that the receiver may clearly and directly know the practical operation of the sender, and propagation effects between the terminals may be improved.

Fifth Embodiment

Figure 5:
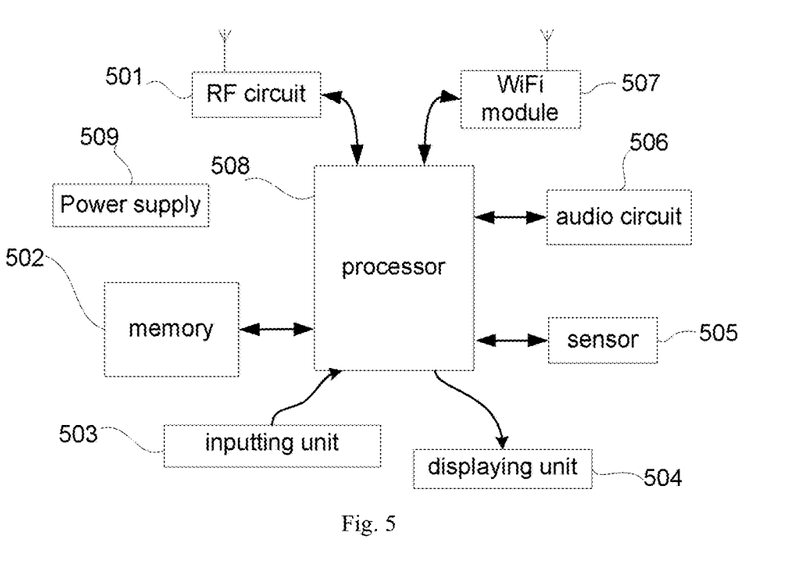
FIG. 5 is a structure diagram of a terminal according to a fifth embodiment of the invention.

The embodiment of the invention further provides a terminal, and as shown in FIG. 5, the terminal may include parts such as a Radio Frequency (RF) circuit 501, a memory 502 including one or more than one computer-readable storage medium, an inputting unit 503, a displaying unit 504, a sensor 505, an audio circuit 506, a Wireless Fidelity (WiFi) module 507, a processor 508 including one or more than one processing core and a power supply 509. Those skilled in the art should know that a structure of the terminal shown in FIG. 5 is not intended to limit the terminal, and may include more or fewer parts than those shown in the figure, or combinations of some parts, or different part arrangement.

In the above, the RF circuit 501 may be configured to receive and send a signal in an information transmission and receiving or communication process, particularly transmit downlink information of a base station to one or more than one processor 508 for processing after receiving it, and also send involved uplink data to the base station. Usually, the RF circuit 501 includes, but not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the RF circuit 501 may further communicate with other equipment through the wireless communication and network. Wireless communication may adopt any communication standard or protocol, including, but not limited to, Global System of Mobile Communication (GSM), General Packet Radio Service (GPRS), Code Division Multiple Access (CDMA), Wideband Code Division Multiple Access (WCDMA), Long Term Evolution (LTE), electronic mail, Short Messaging Service (SMS) and the like.

The memory 502 may be configured to store software programs and modules, and the processor 508 runs the software programs and modules stored in the memory 502, thereby executing various function applications and data processing. The memory 502 may mainly include a program storage area and a data storage area, wherein the program storage area may store operating systems, application programs required by at least one function (such as a sound play function and an image play function) and the like; and the data storage area may store data (such as audio data and a telephone book) created according to use of the terminal and the like. In addition, the memory 502 may include a high speed random access memory, and may also include a nonvolatile memory, such as at least one disk memory, a flash memory or another volatile solid state memory. Correspondingly, the memory 502 may further include a memory controller for providing access to the memory 502 for the processor 508 and the inputting unit 503.

The inputting unit 503 may be configured to receive input digital or character information and generate keyboard, mouse, operating rod, optical or trackball signal input related to user setting and function control. In a specific embodiment, the inputting unit 503 may include a touch-sensitive surface and other input equipment. The touch-sensitive surface, also called a touch display screen or a touchpad, may collect touch operation of a user thereon or nearby (such as operation of the user executed on the touch-sensitive surface or nearby the touch-sensitive surface by virtue of any proper object such as a finger and a stylus) and drive a corresponding connecting device according to a preset program. Optionally, the touch-sensitive surface may include two parts, i.e. a touch detection device and a touch controller, wherein the touch detection device detects a touch direction of the user, detects a signal generated by the touch operation, and sends the signal to the touch controller; and the touch controller receives touch information from the touch detection device, converts it into a touch coordinate for sending to the processor 508, and may receive and execute a command sent by the processor 508. In addition, the touch-sensitive surface may be implemented by adopting a resistor, a capacitor, infrared rays, surface acoustic waves and the like. Besides the touch-sensitive surface, the inputting unit 503 may further include the other input equipment. Specifically, the other input equipment may include, but not limited to, one or more of a physical keyboard, a function key (such as a volume control key and an on/off key), a trackball, a mouse, an operating rod and the like.

The displaying unit 504 may be configured to display information input by the user or information provided for the user and various graphic user interfaces of the terminal, and these graphic user interfaces may be formed by graphics, texts, icons, videos and any combinations thereof. The displaying unit 504 may include a display panel, and the display panel may be optionally configured in form of Liquid Crystal Display (LCD), Organic Light-Emitting Diode (OLED) and the like. Furthermore, the touch-sensitive surface may cover the display panel, the touch operation on or nearby the touch-sensitive surface is sent to the processor 508 to determine a type of a touch event after being detected, and then the processor 508 provides corresponding visual output on the display panel according to the type of the touch event. Although the touch-sensitive surface and display panel in FIG. 5 realize input and output functions as two independent parts, the touch-sensitive surface and the display panel may be integrated to realize the input and output functions in some embodiments.

The terminal may further include at least one sensor 505, such as a light sensor, a motion sensor and another sensor. Specifically, the light sensor may include an ambient light sensor and a proximity sensor, wherein the ambient light sensor may regulate luminance of the display panel according to brightness of ambient light, and the proximity sensor may turn off the display panel and/or backlight when the terminal moves to an ear. As a motion sensor, a gravity acceleration sensor may detect a magnitude of acceleration in each direction (usually three axes), may detect a magnitude and direction of gravity under a still condition, and may be configured to identify a state application of the terminal (such as horizontal and vertical screen switching, a related game and magnetometer state calibration), a vibration identification related function (such as a pedometer and knocking) and the like; and the other sensor, such as a gyroscope, an air pressure gauge, a hygrometer, a thermometer and an infrared sensor, which may be configured in the terminal will not be elaborated herein.

The audio circuit 506, a loudspeaker and a microphone may provide an audio interface between the user and the terminal. The audio circuit 506 may transmit an electric signal converted from received audio data to the loudspeaker, and the loudspeaker converts the electric signal into a sound signal for output; and on the other hand, the microphone converts a collected sound signal into an electric signal, and the audio circuit 506 receives and converts the electric signal into audio data, outputs the audio data to the processor 508 for processing, and sends the audio data to, for example, another terminal through the RF circuit 501, or outputs the audio data to the memory 502 for further processing. The audio circuit 506 may further include an earplug hole for providing communication between an external earphone and the terminal.

WiFi belongs to a short-distance wireless transmission technology, the terminal may help the user to send and receive electronic mails, browse web pages, access streaming media and the like through the WiFi module 507, and it provides wireless wideband Internet access for the user. Although the WiFi module 507 is shown in FIG. 5, it may be understood that it is not a necessary component of the terminal and may completely be eliminated without changing the scope of the nature of the invention according to a requirement.

The processor 508, as a control center of the terminal, connects each part of the whole mobile phone by virtue of various interfaces and lines, and executes various functions and data processing of the terminal by running or executing the software programs and/or modules stored in the memory 502 and calling the data stored in the memory 502, thereby monitoring the whole mobile phone. Optionally, the processor 508 may include one or more processing cores; and preferably, the processor 508 may integrate an application processor and a modulation and demodulation processor, wherein the application processor mainly processes an operating system, a user interface, an application program and the like, and the modulation and demodulation processor mainly processes wireless communication. It may be understood that the modulation and demodulation processor may also not be integrated into the processor 508.

The terminal further includes the power supply 509 (such as a battery) for supplying power to each part, and optionally, the power supply may be logically connected with the processor 508 through a power management system, thereby realizing functions of charging and discharging management, power consumption management and the like through the power management system. The power supply 509 may further include one or more than one direct current or alternating current power supply, rechargeable system, power failure detection circuit, power converter or inverter, power state indicator and the like.

Although not being shown, the terminal may further include a camera, a Bluetooth module and the like, which will not be elaborated herein. Specifically, in the embodiment, the processor 508 of the terminal may load executable files corresponding to processes of one or more than one application program into the memory 502 according to the following instructions, and the processor 508 runs the application programs stored in the memory 502, thereby realizing various functions:

receiving a keyboard operation message; acquiring indication information of a corresponding operated key according to the keyboard operation message; acquiring key meaning information corresponding to the indication information according to a preset keyboard escape table; displaying the indication information and the corresponding key meaning information in a shared screen; and sending contents displayed in the shared screen to a target terminal when a sharing request of the target terminal is received.

Alternatively, the processor 508 may further be configured to: determine a window of a currently obtained window focus; determine a terminal application which processes the keyboard operation message according to the window of the currently obtained window focus; and acquire the indication information of the corresponding operated key according to the keyboard operation message on the basis of the terminal application.

Alternatively, the processor 508 may further be configured to acquire a preset corresponding keyboard escape table according to the terminal application.

Alternatively, the processor 508 may further be configured to register a global keyboard hook; and receive the keyboard operation message through the global keyboard hook.

Alternatively, the processor 508 may further be configured to receive the keyboard operation message triggered to be sent by clicking a key of a keyboard by a user.

Alternatively, the processor 508 may further be configured to display the indication information and the corresponding key meaning information in a preset area of the shared screen.

From the above, it can be seen that: according to the terminal provided by the embodiment, the terminal, as a sender, acquires the indication information of the corresponding operated key according to the keyboard operation message input by the user, acquires the corresponding key meaning information according to the preset keyboard escape table, displays the indication information and the corresponding key meaning information together and sends the contents displayed in the shared screen to the target terminal when the sharing request of a receiver (i.e. the target terminal) is received. According to the embodiment of the invention, the sender sends both the information of indicating the operated key and the corresponding key meaning information to the receiver, and compared with an existing manner of only providing limited one-way propagation, such a manner has the advantages that the receiver may clearly and directly know the practical operation of the sender, and propagation effects between the terminals may be improved.

Sixth Embodiment

The embodiment of the invention further provides a storage medium. Optionally, in the embodiment, the storage medium may be configured to store program codes for a method for interaction between terminals in the embodiment of the invention.

Optionally, in the embodiment, the storage medium may be located in at least one piece of network equipment in multiple pieces of network equipment in a network such as a mobile communication network, a wide area network, a metropolitan area network or a local area network.

Optionally, in the embodiment, the storage medium is configured to store application codes configured to execute following steps:

Step 1: a keyboard operation message is received;

Step 2: indication information of a corresponding operated key is acquired according to the keyboard operation message;

Step 3: key meaning information corresponding to the indication information is acquired according to a preset keyboard escape table;

Step 4: the indication information and the corresponding key meaning information are displayed in a shared screen; and Step 5: contents displayed in the shared screen are sent to a target terminal when a sharing request of the target terminal is received.

Optionally, in the embodiment, the storage medium is further configured to store program codes configured to execute following steps: a window of a currently obtained window focus is determined after the keyboard operation message is received; a terminal application which processes the keyboard operation message is determined according to the window of the currently obtained window focus; wherein the acquiring the indication information of the corresponding operated key according to the keyboard operation message comprises that: the indication information of the corresponding operated key is acquired according to the keyboard operation message on the basis of the terminal application.

Optionally, in the embodiment, the storage medium is further configured to store program codes configured to execute following step: the preset corresponding keyboard escape table is acquired according to the terminal application before the key meaning information corresponding to the indication information is acquired according to the preset keyboard escape table.

Optionally, in the embodiment, the storage medium is further configured to store program codes configured to execute following step: a global keyboard hook is registered before the keyboard operation message is received, wherein the step that the keyboard operation message is received includes that: the keyboard operation message is received through the global keyboard hook.

Optionally, in the embodiment, the storage medium is further configured to store program codes configured to execute following steps: the keyboard operation message triggered to be sent by clicking a key of a keyboard by a user is received.

Optionally, in the embodiment, the storage medium is further configured to store program codes configured to execute following steps: the step that the indication information and the corresponding key meaning information are displayed in the shared screen includes that: the indication information and the corresponding key meaning information are displayed in a preset area of the shared screen.

Optionally, in the embodiment, the storage medium may include, but not limited to: various media capable of storing program codes such as a U disk, a Read-Only Memory (ROM), a Random Access Memory (RAM), a mobile hard disk, a magnetic disk or a compact disc.

Optionally, in the embodiment, the processor executes following operations according to the program codes stored in the storage medium: receiving the keyboard operation message, acquiring the indication information of the corresponding operated key according to the keyboard operation message, acquiring the key meaning information corresponding to the indication information according to the preset keyboard escape table, displaying the indication information and the corresponding key meaning information in the shared screen and sending the contents displayed in the shared screen to the target terminal when the sharing request of the target terminal is received.

In the abovementioned embodiments, each embodiment is described from different emphasis points, and parts which are not detailed in a certain embodiment may refer to detailed descriptions about the method for interaction between the terminals, and will not be elaborated herein.

The device for interaction between the terminals provided by the embodiment of the invention is, for example, a computer, a tablet computer and a mobile phone with a touch function, the device for interaction between the terminals adopts the same concept with the method for interaction between the terminals in the abovementioned embodiment, any method provided by the embodiments of the method for interaction between the terminals may be run on the device for interaction between the terminals, and details about its specific implementation process refer to the embodiments of the method for interaction between the terminals, and will not be elaborated herein.

It is important to note that: for the method for interaction between the terminals in the embodiment of the invention, those skilled in the art should know that all or part of the flow of the method for interaction between the terminals in the embodiment of the invention may be implemented by related hardware controlled by a computer program, the computer program may be stored in a computer-readable storage medium, for example, a memory of the terminal, and may be executed by at least one processor in the terminal, and an execution process may include the flow in the embodiment of the method for interaction between the terminals, wherein the storage medium may be a magnetic disk, a compact disc, a ROM, a RAM and the like.

For the device for interaction between the terminals in the embodiment of the invention, each function module may be integrated in a processing chip, each module may also independently physically exist, and two or more than two modules may also be integrated into a module. The integrated module may be implemented in form of hardware, and may also be implemented in form of software function module. If being implemented in form of software function module and sold or used as an independent product, the integrated module may also be stored in a computer-readable storage medium, and the storage medium is, for example, a ROM, a magnetic disk, a compact disc or the like.

The method and device for interaction between the terminals provided by the embodiment of the invention are introduced above in detail, the principle and implementation modes of the invention are elaborated with specific examples in the invention, and the above descriptions about the embodiments are only adopted to help the method of the invention and its core concept to be understood; and meanwhile, those skilled in the art may make variations to the specific implementation modes and the scope of application according to the concept of the invention. From the above, the contents of the specification shall not be understood as limits to the invention.

What is claimed is:

1. A method for interaction between terminals, performed at a device having one or more processors and a memory for storing programs to be executed by the processors, wherein the method comprises:
  receiving a keyboard operation message;
  acquiring indication information of a corresponding operated key according to the keyboard operation message, wherein the indication information is configured to indicate information about the operated key;
  acquiring key meaning information corresponding to the indication information according to a preset keyboard escape table;
  displaying the indication information and the corresponding key meaning information in a shared screen; and
  sending contents displayed in the shared screen to a target terminal when a sharing request of the target terminal is received.

2. The method for interaction between the terminals according to claim 1, after receiving the keyboard operation message, further comprising:
  determining a window of a currently obtained window focus; and
  determining a terminal application which processes the keyboard operation message according to the window of the currently obtained window focus;
  wherein the acquiring the indication information of the corresponding operated key according to the keyboard operation message comprises: acquiring the indication information of the corresponding operated key according to the keyboard operation message on the basis of the terminal application.

3. The method for interaction between the terminals according to claim 2, before acquiring the key meaning information corresponding to the indication information according to the preset keyboard escape table, further comprising:
  acquiring the preset corresponding keyboard escape table according to the terminal application.

4. The method for interaction between the terminals according to claim 2, before receiving the keyboard operation message, further comprising:
  registering a global keyboard hook,
  wherein the receiving the keyboard operation message comprises: receiving the keyboard operation message through the global keyboard hook.

5. The method for interaction between the terminals according to claim 2, wherein the receiving the keyboard operation message comprises:
   receiving the keyboard operation message triggered to be sent by clicking a key of a keyboard by a user.

6. The method for interaction between the terminals according to claim 2, wherein the displaying the indication information and the corresponding key meaning information in the shared screen comprises:
   displaying the indication information and the corresponding key meaning information in a preset area of the shared screen.

7. The method for interaction between the terminals according to claim 1, wherein the displaying the indication information and the corresponding key meaning information in the shared screen comprises:
   displaying the indication information and the corresponding key meaning information in a preset area of the shared screen.

8. A device for interaction between terminals, comprising:
   one or more processors, configured to execute one or more program modules stored in a memory;
   the memory; and
   wherein the one or more program modules further comprise:
   a receiving module, configured to receive a keyboard operation message;
   a first acquiring module, configured to acquire indication information of a corresponding operated key according to the keyboard operation message, wherein the indication information is configured to indicate information about the operated key;
   a second acquiring module, configured to acquire key meaning information corresponding to the indication information according to a preset keyboard escape table;
   a displaying module, configured to display the indication information and the corresponding key meaning information in a shared screen; and
   a sharing and sending module, configured to send contents displayed in the shared screen to a target terminal when a sharing request of the target terminal is received.

9. The device for interaction between the terminals according to claim 8, wherein the one or more program modules further comprise:
   a determining module, configured to determine a window of a currently obtained window focus, and determine a terminal application which processes the keyboard operation message according to the window of the currently obtained window focus,
   wherein the first acquiring module is configured to acquire the indication information of the corresponding operated key according to the keyboard operation message on the basis of the terminal application.

10. The device for interaction between the terminals according to claim 9, wherein the second acquiring module is further configured to acquire the preset corresponding keyboard escape table according to the terminal application.

11. The device for interaction between the terminals according to claim 9, wherein the one or more program modules further comprise:
   a registering module, configured to register a global keyboard hook,
   wherein the receiving module is configured to receive the keyboard operation message through the global keyboard hook.

12. The device for interaction between the terminals according to claim 9, wherein the receiving module is further configured to receive the keyboard operation message triggered to be sent by clicking a key of a keyboard by a user.

13. The device for interaction between the terminals according to claim 9, wherein the displaying module is configured to display the indication information and the corresponding key meaning information in a preset area of the shared screen.

14. The device for interaction between the terminals according to claim 8, wherein the displaying module is configured to display the indication information and the corresponding key meaning information in a preset area of the shared screen.

15. A non-transitory computer-readable storage medium, configured to store program codes configured to execute following steps:
   receiving a keyboard operation message;
   acquiring indication information of a corresponding operated key according to the keyboard operation message, wherein the indication information is configured to indicate information about the operated key;
   acquiring key meaning information corresponding to the indication information according to a preset keyboard escape table;
   displaying the indication information and the corresponding key meaning information in a shared screen; and
   sending contents displayed in the shared screen to a target terminal when a sharing request of the target terminal is received.

16. The non-transitory computer-readable storage medium according to claim 15, further configured to store program codes configured to execute following steps:
   after receiving the keyboard operation message, determining a window of a currently obtained window focus; and
   determining a terminal application which processes the keyboard operation message according to the window of the currently obtained window focus,
   wherein the acquiring the indication information of the corresponding operated key according to the keyboard operation message comprises: acquiring the indication information of the corresponding operated key according to the keyboard operation message on the basis of the terminal application.

17. The non-transitory computer-readable storage medium according to claim 16, further configured to store program codes configured to execute following steps:
   before acquiring the key meaning information corresponding to the indication information according to the preset keyboard escape table, acquiring the preset corresponding keyboard escape table according to the terminal application.

18. The non-transitory computer-readable storage medium according to claim 16, further configured to store program codes configured to execute following steps:
   before receiving the keyboard operation message, registering a global keyboard hook,
   wherein the receiving the keyboard operation message comprises: receiving the keyboard operation message through the global keyboard hook.

19. The non-transitory computer-readable storage medium according to claim 16, further configured to store program codes configured to execute following steps:
   receiving the keyboard operation message triggered to be sent by clicking a key of a keyboard by a user.

20. The non-transitory computer-readable storage medium according to claim 15, further configured to store program codes configured to execute following steps:
    displaying the indication information and the corresponding key meaning information in a preset area of the shared screen.

\* \* \* \* \*